VAN BUREN RATTERREE & C. L. WATERSTON.
AUTOMOBILE LICENSE NUMBER CASE.
APPLICATION FILED MAR. 28, 1913.

1,086,937.

Patented Feb. 10, 1914.

Witnesses
Wm. H. Mulligan.
R. M. Smith.

Inventors
Van B. Ratterree
Charles L. Waterston
By Victor J. Evans.
Attorney

UNITED STATES PATENT OFFICE.

VAN BUREN RATTERREE AND CHARLES L. WATERSTON, OF NASHVILLE, TENNESSEE.

AUTOMOBILE LICENSE-NUMBER CASE.

1,086,937. Specification of Letters Patent. Patented Feb. 10, 1914.

Application filed March 28, 1913. Serial No. 757,417.

*To all whom it may concern:*

Be it known that we, VAN BUREN RATTERREE and CHARLES L. WATERSTON, citizens of the United States, residing at Nashville, in the county of Davidson and State of Tennessee, have invented new and useful Improvements in Automobile License-Number Cases, of which the following is a specification.

This invention relates to automobile license number cases, the object in view being to provide a highly ornamental weatherproof transparent casing for the number plates required under the various State and municipal license laws governing automobiles, whereby the number plate is conspicuously displayed and adapted to be maintained in a clean condition, the number plate itself being hermetically sealed within the casing and all possibility of dust, dirt, oil or other foreign matter obtaining access thereto being prevented.

With the above and other objects in view, the invention consists in the construction, combination and arrangement of parts, as will be hereinafter more fully described, illustrated in the accompanying drawings, and pointed out in the claim hereunto appended.

Figure 1:
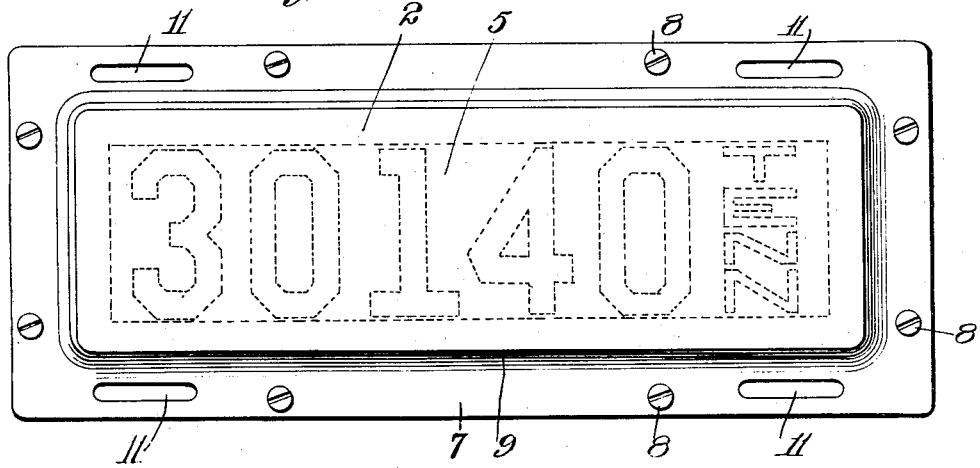
Figure 2:
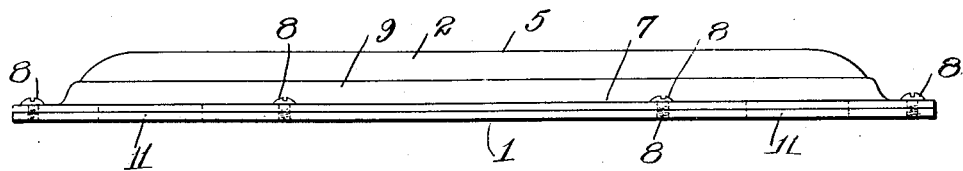
Figure 3:
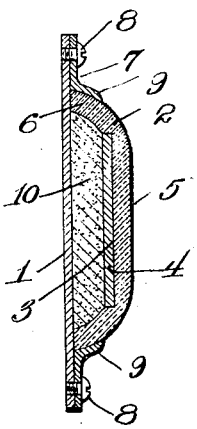

In the drawings: Figure 1 is a front elevation of the license number case of this invention. Fig. 2 is an edge view of the same. Fig. 3 is a cross section through the same.

The license number case contemplated in this invention comprises essentially a base plate or back cover 1 which is preferably constructed of a flat piece of sheet metal of any desired gage or thickness.

Resting against the front face of the base plate 1 is a front cover 2 of convex-faced molded glass, said molded glass cover being recessed in its inner side, as shown at 3, to admit the number plate 4 which is inserted therein from the back, and which is entirely covered in, inclosed and protected by the central portion 5 of the cover. The marginal edge portion of the cover 2 is preferably of considerable thickness as compared with the portion 3 of the cover, so as to form a marginal flange which bears against the base plate 1. The space remaining behind the number plate 4 is entirely filled out flush with the edge of the flange 6 of the cover by weather proof material, such as plaster Paris, or other commercial cement, thereby effectually excluding moisture from the number plate 4.

Extending entirely around the cover plate and along the margin of the base plate 1 is a retaining frame 7 secured to the base plate 1 by any number of fasteners 8, shown for convenience in the form of screws, although it will be apparent that any other form of fastening device may be employed. The retaining frame 7 is provided with a flange 9 conforming in shape to the exterior surface of the flange 6 of the molded glass front cover 2, as clearly illustrated in the drawings, so that when the frame 7 is secured to the base plate 1, the molded glass cover is firmly clamped against the base plate, while the base plate backs up the weather-proof filling, indicated at 10, and forms an adequate support therefor.

At suitable points, strap receiving holes 11 are formed through the base plate 1, and the retaining plate 7, so as to enable the device as a whole to be suspended from or otherwise fastened to the frame or other part of the automobile.

The cover is formed of heavy convex-faced molded glass which possesses the proper protective qualities, equivalent to or greater than the usual enameling. The number plate is fully inclosed and hermetically sealed within the casing and, therefore, the original magnitude, brightness and newness of appearance of the numbers and figures or other data thereon is preserved indefinitely. The molded glass cover repels all dust, dirt, and mud, and in case of any such material adhering thereto, it may be easily washed off, without the water or other cleaning material coming into contact with the back or number plate.

Any desired finish may be given to the cover plate, as the interior of the marginal portion or flange of the cover plate may receive a coating of gold, nickel, aluminum, bronze, or the like. The degree of ornamental finish attained in this way will enable the device as a whole to harmonize with the automobile and its finish, and will meet with the approval of fastidious owners of motor cars, doing away with the unsightly appearance of the metallic license number tags now in common use.

By leaving the greater part of the convex faces of the cover glass exposed, refractive marginal portions are provided which materially increases the angle at which the characters may be read.

What is claimed is:

In an automobile license number and mounting, a substantially rectangular and imperforate container of glass having convex margins forming refractive portions, said container being formed in its inner face with a shallow recess to receive a number plate, and also formed with a deeper recess in rear of and continuous with the first named recess, a number plate arranged in said shallow recess, a waterproof filling back of said number plate hermetically sealing in the number plate and filling said deeper recess, and a retaining frame extending entirely around the container and embodying flanges of concavo-convex shape in cross section and only partially embracing the convex margins of the container so as to leave part of said refractive surfaces exposed.

In testimony whereof we affix our signatures in presence of two witnesses.

VAN B. RATTERREE.
CHARLES L. WATERSTON.

Witnesses:
Thos. N. Remy,
Roy R. Rogers.